(12) United States Patent
Yang

(10) Patent No.: US 6,700,999 B1
(45) Date of Patent: Mar. 2, 2004

(54) SYSTEM, METHOD, AND APPARATUS FOR MULTIPLE FACE TRACKING

(75) Inventor: Liuyang Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 740 days.

(21) Appl. No.: 09/607,338

(22) Filed: Jun. 30, 2000

(51) Int. Cl.[7] ............................................. G05B 19/00
(52) U.S. Cl. ..................................... 382/118; 340/5.83
(58) Field of Search ................................. 382/115, 118, 382/103; 351/204; 342/183, 191; 348/169; 340/5.83

(56) References Cited

U.S. PATENT DOCUMENTS 6,111,517 A * 8/2000 Atick et al. ................. 340/5.83

OTHER PUBLICATIONS

Dorin Comaniciu et al., "Mean Shift analysis and applications", The Proceedings of the Seventh IEEE International Conference on Computer Vision, vol. 2, pp 1197–1203, 1999.*

Dorin Comaniciu et al., "Robust Analysis of Feature Spaces: Color Image Segmentation", IEEE, pp750–755 , 1997.*

Raja Yogesh, et al., "Tracking and Segmenting people in varying lighting conditions using colour", Proceedings. Thrid IEEE International Conference on Automatic Face and Gesture Recognition, pp228–233, 1998.*

Martin Hunke et al., "Face Locating and Tracking for Human–Computer Interaction", IEEE, pp1277–1281, 1995.*

Gary R. Bradski, Intel Technology Journal, "Computer Vision Face Tracking for Use in a Perceptual User Interface", Q2 1998, http://developer.intel.com/technology/itj/q21998/articles/art_2.htm.

Chellapa et al., Proceedings of the IEEE, "Human and Machine Recognition of Faces: A survey", vol. 83, No. 5, pp. 705–740, May 1995.

Samal and Iyengar, Pattern Recognition, "Automatic recognition and analysis of human faces and facial expressions: A survey"; vol. 25, No. 1, pp. 65–77, Jan. 1992.

* cited by examiner

Primary Examiner—Samir Ahmed
(74) Attorney, Agent, or Firm—Pillsbury Winthrop LLP

(57) ABSTRACT

A system, method, and apparatus are disclosed that support automatic tracking of multiple faces in a sequence of digital images. Temporal filtering may be applied to reduce both missed detections and false alarms. Multiple modes may also be implemented to reduce processor load.

33 Claims, 18 Drawing Sheets

SYSTEM, METHOD, AND APPARATUS FOR MULTIPLE FACE TRACKING

BACKGROUND OF THE INVENTION

1. Field of the Invention

This invention relates to face tracking. More specifically, this invention relates to tracking of multiple faces in a digital video sequence.

2. Description of Related Art

Face tracking methods have potential applications in a wide range of fields including human-computer interaction, computer-assisted communication, and content-directed video encoding. However, many existing face tracking systems make simplifying assumptions about image context or content which may not be appropriate. For example, a system may assume that only one face will appear in a video frame. While this assumption may be reasonable for applications such as a single-player video game, it may not be appropriate for other applications such as video conferencing or encoding of video content for broadcast.

It is desirable to obtain automatic tracking of possibly multiple faces at a high accuracy and a low false alarm rate. It is also desirable to perform such a task while minimizing processor load, thereby allowing other tasks to be performed concurrently.

DETAILED DESCRIPTION

Figure 1:
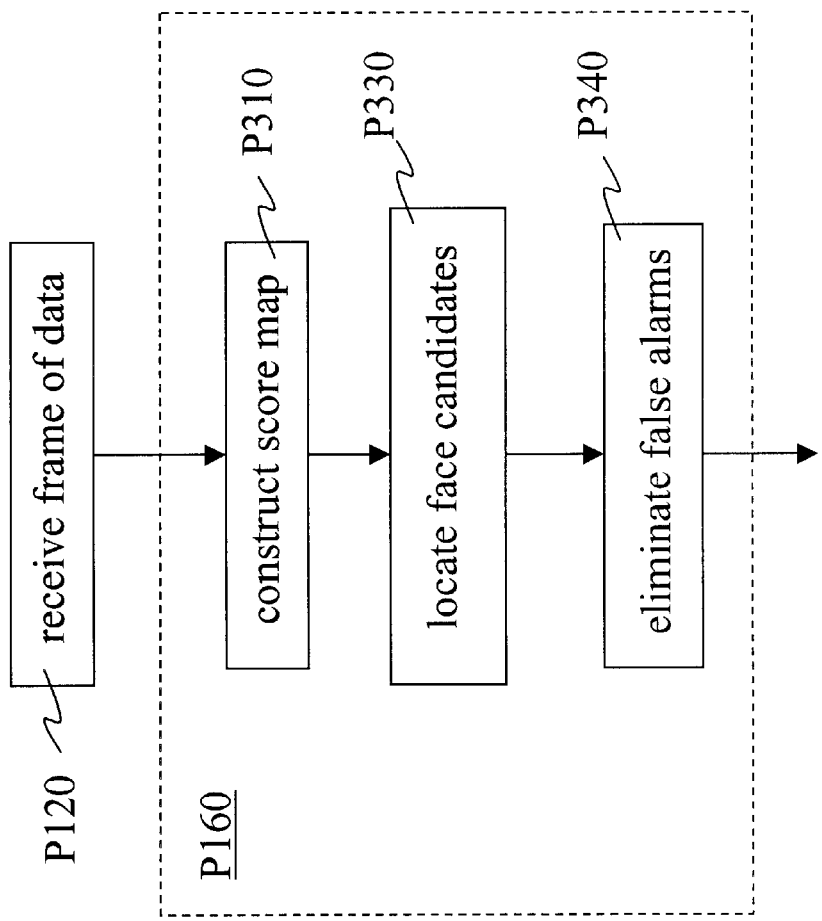
FIG. 1 is a flow chart for a method according to an embodiment of the invention.

FIG. 1 shows a flow chart for a method according to an embodiment of the invention. In task P120, a frame of video data is received from a digital source. This digital source may be a digital camera, videotape player, or scanner. The frame may also be received from a memory or storage device, or it may be received from a remote device (e.g., across a network). Alternatively, the frame may be received from a digitizer connected to an analog imaging device such as a camera or videotape player.

In the described embodiments, each pixel in the frame of data has a value that corresponds to a location in the HSV (or HSI) color space. That is to say, each pixel has a value that includes a hue component, a saturation component, and an intensity component. One advantage to using the HSV color space is that a decision regarding an indication of human skin may be made to a high degree of confidence using only the value of the hue component. However, a method according to an embodiment of the invention may be practiced in any other color space as well, including the well-known RGB, YCrCb and YIQ color spaces and variants thereof.

In task P160, a decision is made regarding the number of faces in the frame and the locations of those faces. In an exemplary implementation, the decision of task P160 is based upon a spatial analysis of the current frame only (i.e. without reference to information from other frames in the sequence).

As shown in FIG. 1, task P160 may be divided into three principal subtasks. In construction subtask P310, a two-dimensional score map for the frame is constructed. Each entry in this score map corresponds to a pixel of the received frame, and each entry has a value that represents a measure of similarity between the value of the corresponding pixel and a human flesh tone.

In one embodiment of the invention, construction subtask P310 is performed with reference to a histogram that relates pixel values to flesh-tone probabilities. A particular example of such a histogram relates each among a range of hue component values to a probability that the corresponding hue represents a flesh tone. For example, a hue between magenta and yellow will generally be related to a higher flesh-tone probability than a hue between blue and green. A default histogram (e.g., as supplied by a manufacturer of one or more hardware and/or software components of the imaging system) may be used in such an embodiment of construction subtask P310. Alternatively, a training procedure may be conducted to create or obtain a histogram that is optimized for a particular camera or imaging system, a particular skin tone, and/or a particular location or lighting situation (e.g., daylight, fluorescent lighting, etc.).

If a color space other than HSV is used, it may be necessary to consider more than one of the components of the value of a pixel in order to make a flesh-tone determination in construction subtask P310. Alternatively, the value of a pixel may be mapped to the HSV color space before such determination is made.

Even within the HSV color space, better face tracking performance may be obtained by screening additional components of the pixel value in construction subtask P310. For example, it may be desirable to eliminate pixels whose other components have values unlikely to appear in an indication of human skin (e.g. pixels having very high saturation and/or intensity values).

In location subtask P330, a segmentation operation is applied to the score map in order to locate face candidate regions within it. A face candidate region is a group of entries that correspond to neighboring pixels and have high flesh-tone probability values. In particular implementations, membership of a face candidate region may be further restricted to include only those entries whose corresponding pixels share a similarity of other characteristics (e.g. a similarity of hue) with the corresponding pixels of one or more entries in the region.

Figure 2:
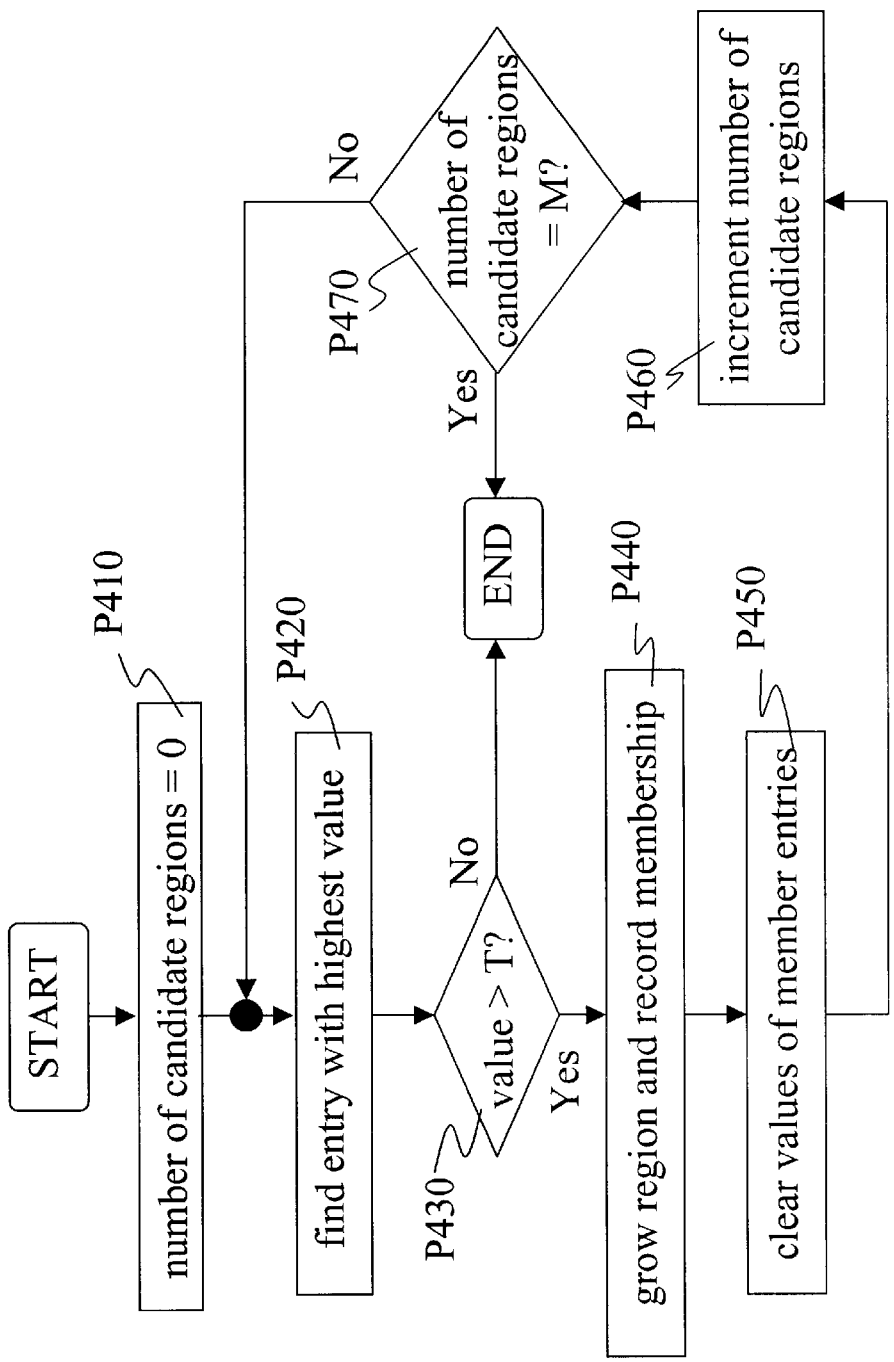
FIG. 2 is a flow chart for a particular implementation of subtask P310 of FIG. 1.

In an exemplary implementation, location subtask P330 is performed using a region-growing process as shown in FIG. 2. In initialization sub-subtask P410, a counter that indicates the number of candidate regions located so far is initialized (e.g., set to zero). In selection sub-subtask P420, the score map is searched in order to select the entry that has the highest flesh-tone probability value. In comparison sub-subtask P430, the value of the selected entry is compared to a predetermined threshold T. If the test fails (e.g., the value does not exceed T), then subtask P330 terminates. If the test of comparison sub-subtask P430 succeeds (e.g., the value of the selected entry exceeds T), then the region is grown and its membership recorded in segmentation sub-subtask P440.

In performing segmentation sub-subtask P440, the score map may be processed as a two-dimensional array such that a relation of neighborhood (in, e.g., a four-connected or eight-connected sense) may be defined among the entries in the same fashion that such a relation may be defined among the corresponding pixels in the image. In one such implementation of segmentation sub-subtask P440, each neighbor of the selected entry is visited in order to determine whether the neighbor has a value similar to that of the selected entry. This similarity decision may involve only a determination as to whether the flesh-tone probability value of the neighbor exceeds the specified threshold. In other implementations, other features of the neighbor (such as hue, saturation, etc. of the corresponding pixel) may also be compared to corresponding features of the selected entry (or, e.g., to an average value of corresponding features of the region's member entries) to determine similarity. If the result of the similarity decision is positive, the neighbor is added to the face candidate region and its neighbors are visited as well. The region is grown in this fashion until all of the neighbors of its member entries have been visited and the region boundary has been established.

Before segmentation sub-subtask P440 is concluded, a record is made of the face candidate region's membership. In one implementation, a segmentation mask is constructed (e.g. in initialization sub-subtask P410) whose entries correspond to entries of the score map and are initialized to have a background value. At each iteration of segmentation sub-subtask P440, entries in the segmentation mask that correspond to member entries of the currently located face candidate region are updated to have a non-background value. In update sub-subtask P450, the values of the member entries in the score map are initialized (e.g., reset to zero) so that none of these entries will be selected in a future iteration of selection sub-subtask P420.

In counter sub-subtask P460, the counter is incremented to indicate that a face candidate region has been located, and in comparison sub-subtask P470, the value of the counter is compared to a predetermined maximum number M of face candidate regions. If the maximum has been reached, location subtask P330 terminates. Otherwise, the subtask iterates as shown in FIG. 2 until either termination condition is satisfied. In alternative implementations, either comparison sub-subtask P430 or P470 may be omitted, or the termination conditions of one or both of these comparison sub-subtasks may operate differently than shown in FIG. 2 (e.g., to treat the case of inequality differently), or the values of parameters T and/or M may be changed dynamically in response to other conditions.

Although color matching schemes have good performance as face tracking algorithms, they are not entirely immune to false alarms. Some kinds of wood surfaces, for example, may share the same general hue and range of tones as human skin. Moreover, it is possible that other body parts such as hands may have been misidentified as face candidates. In elimination subtask P340, rules relating to cues other than color are applied to detect false alarms and reject them.

Figure 4:
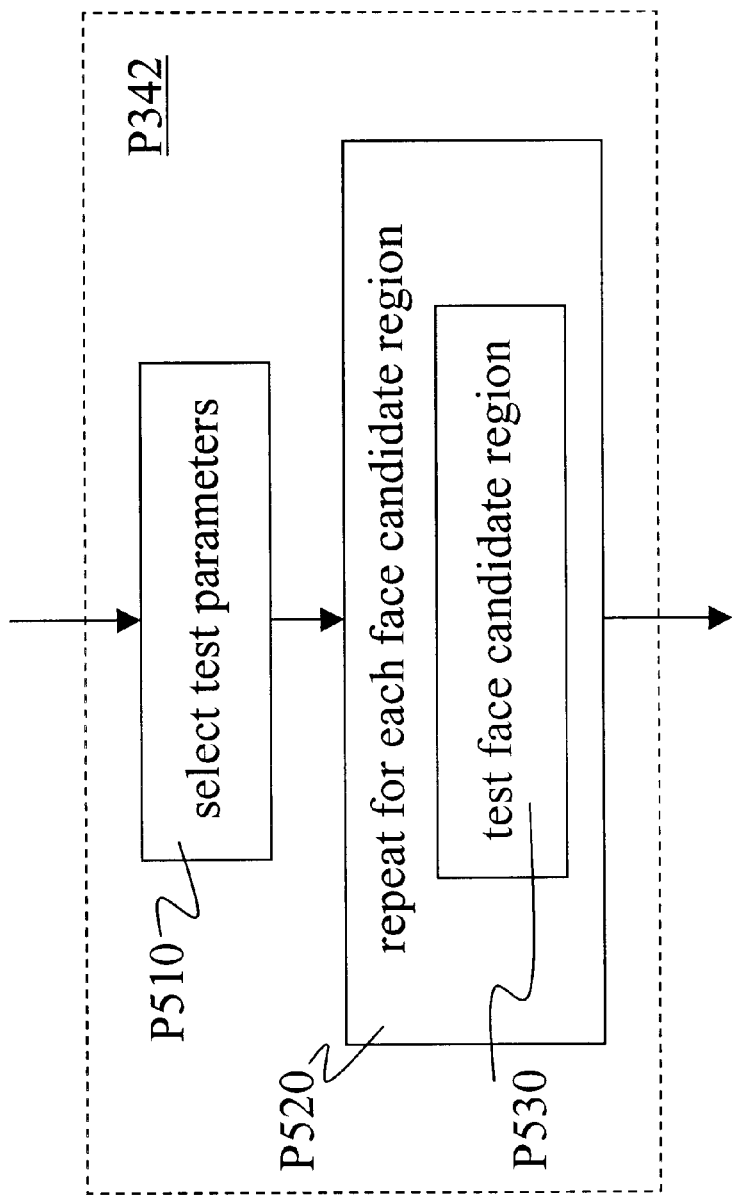
FIG. 4 is a flow chart for an implementation of elimination subtask P340.

FIG. 4 shows a flow chart for an exemplary implementation P342 of elimination subtask P340. In initialization sub-subtask P510, parameters for testing the face candidate regions are selected. In test sub-subtask P530, one or more qualifying tests are performed on a particular face candidate region.

Loop maintenance sub-subtask P520 controls the application of test sub-subtask P530 to the face candidate regions. In a test-sequential implementation, loop maintenance sub-subtask P520 causes test sub-subtask P530 to perform each one in a sequence of tests on all remaining face candidate regions before performing the next test in the sequence of tests. In a region-sequential implementation, loop maintenance sub-subtask P520 causes test sub-subtask P530 to perform a sequence of tests on a face candidate region before beginning testing of the next face candidate region. Implementations of loop maintenance sub-subtask P520 that are intermediate between these two examples are also possible, as are parallelized implementations.

Figure 5:
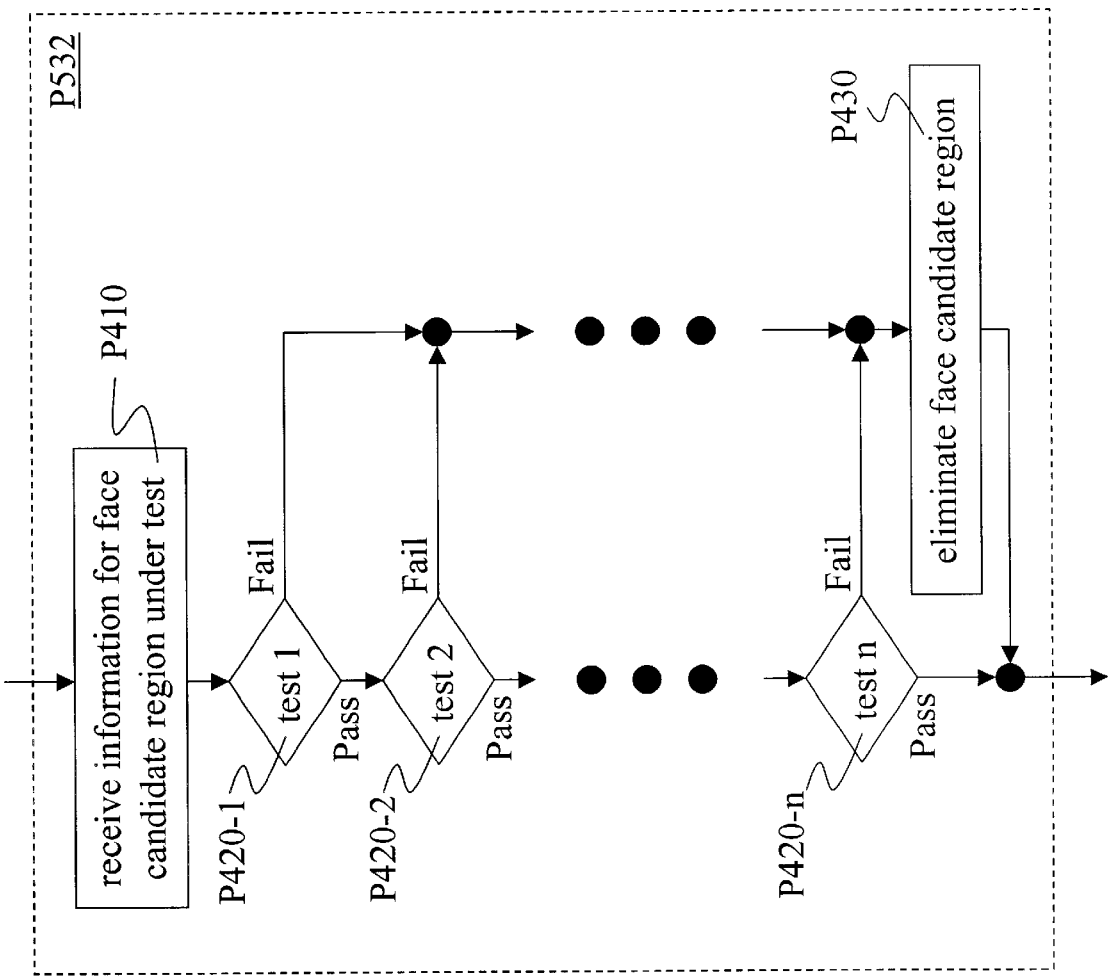
FIG. 5 is a flow chart for an implementation of test sub-subtask P530.

FIG. 5 shows a flow chart for an implementation P532 of test sub-subtask P530 that is suitable for use with a region-sequential implementation of loop maintenance sub-subtask P520 as described above. In block P410, information relating to the face candidate region to be tested is received. This information may include the characteristics to be examined in test sub-subtask P532, or it may indicate where such characteristics may be found. In blocks P420, each in a sequence of tests is performed on the region. The characteristics examined in these tests may include the size, shape, position, and/or aspect ratio of a region; color consistency of the corresponding pixels within a region; and/or relative consistency between different candidate regions. Note that the selection of the characteristics to be tested may also be driven by the particular application (e.g. content-directed encoding), and that this criterion may sometimes override the desire to identify all regions that actually contain faces. If a face candidate region fails to pass any of the tests in blocks P420, subsequent tests are skipped and the region is eliminated in block P430 (e.g. by reclassifying its member entries as background).

Figure 6:
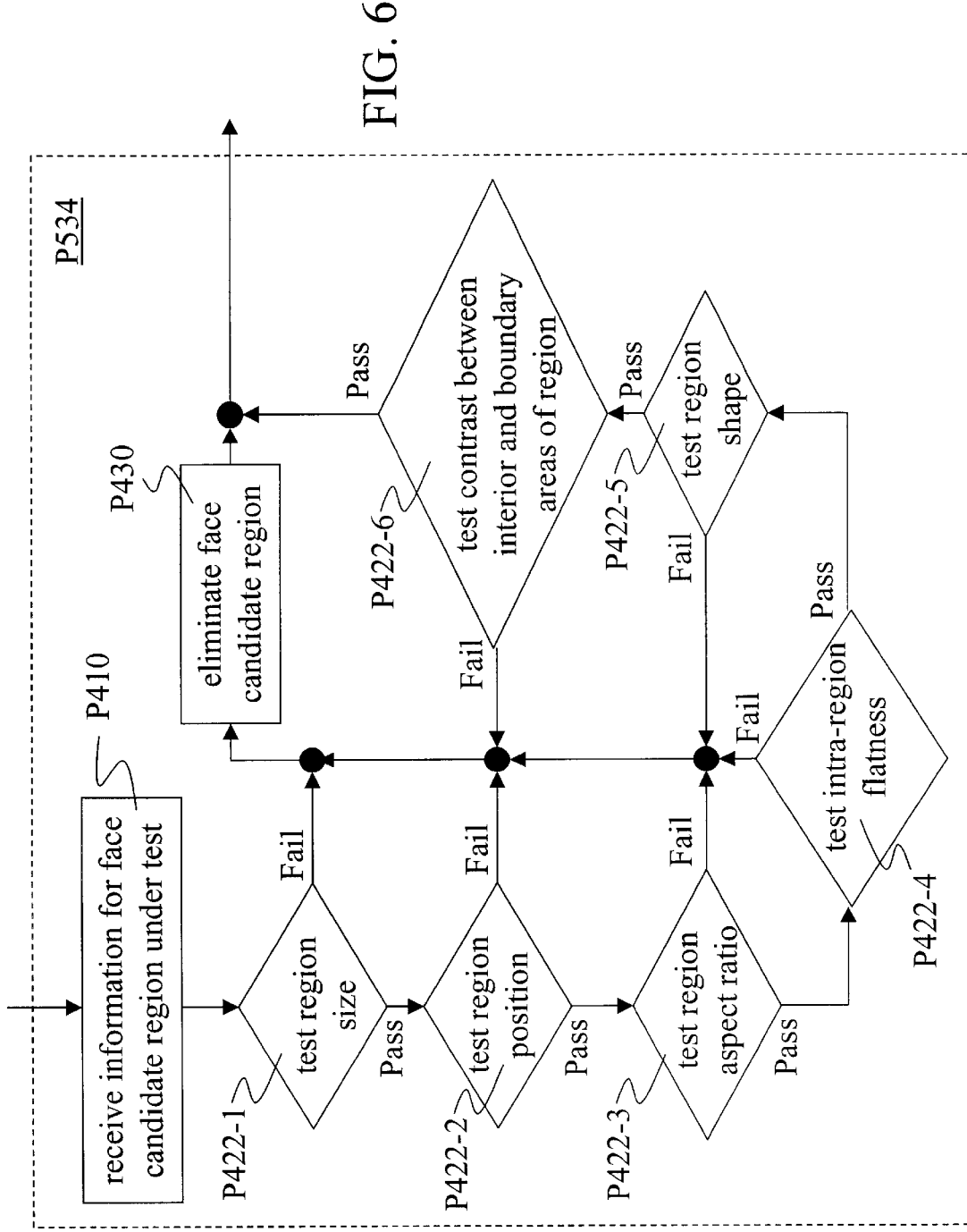
FIG. 6 is a flow chart for an implementation of test sub-subtask P532.

In order to maximize the efficiency of test sub-subtask P532, it may be desirable to order the blocks P420 such that tests with higher expected failure rates are performed earlier in the sequence. FIG. 6 shows an implementation P534 of test sub-subtask P532. This implementation includes several instances P422 of blocks P420 which are arranged in an appropriate sequence. As shown in FIG. 6, each face candidate region may be tested in order as to its size; its position in the frame; its aspect ratio; its flatness; its shape; and the contrast between its interior and boundary areas.

Figure 7:
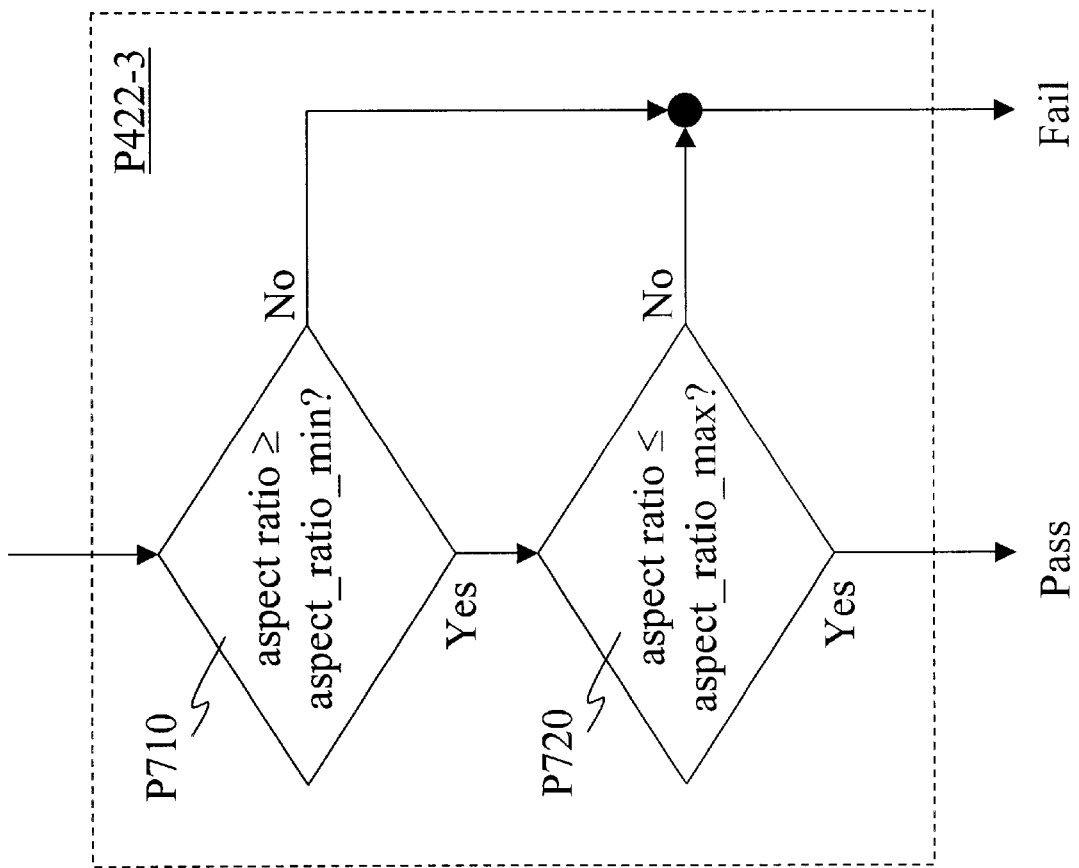
FIG. 7 is a flow chart for an implementation of a block P420.

As an example, FIG. 7 shows one implementation for aspect ratio test block P422-3. In block P710, the aspect ratio of the face candidate region (i.e. the ratio between the width and height of the bounding box corresponding to the region) is compared to a minimum value aspect_ratio_min. If this test fails (i.e. if the region's aspect ratio is below the minimum value), then a fail result is returned. Otherwise, the aspect ratio is compared to a maximum value aspect_ratio_max in block P720, and the result of this test is returned. Depending on the nature of the test and/or the particular application, a single threshold may be sufficient to define an acceptable range of values.

Figure 8:
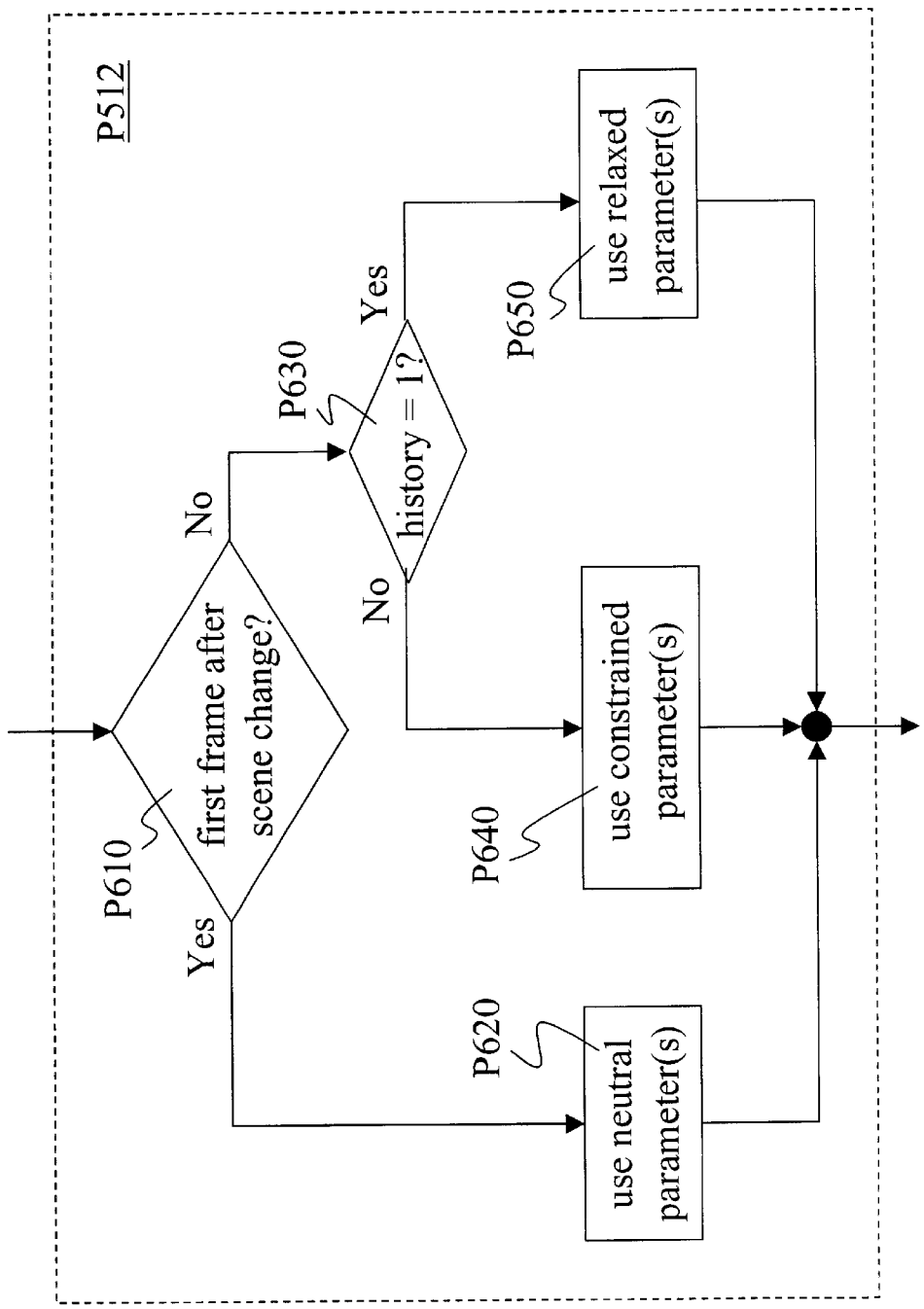
FIG. 8 is a flow chart for an implementation of initialization sub-subtask P510.

As for the value of the parameters used in the tests of elimination subtask P342 (e.g. aspect_ratio_min and aspect_ratio_max), these values may be fixed, in which case initialization sub-subtask P510 may be omitted. For some tests, however, choosing a fixed parameter or parameters may result in unstable tracking behavior over time, especially in cases where a tested value falls close to a test parameter. FIG. 8 shows an implementation P512 of initialization sub-subtask P510 in which state-dependent test parameters are selected for one or more of the tests of test sub-subtask P530. In block P610, if the current frame is the first one after a scene change, then a set of neutral parameters is selected in block P620. An exemplary pair of values for the parameters {aspect_ratio_min, aspect_ratio_max} is {0.35, 1.30}.

If no scene change is detected or reported, then a history parameter is tested in block P630. This parameter is set to a value of one if a face candidate region was present at the same location in the previous frame. If the test fails (i.e. no face candidate region was present at this location), then a set of constrained parameters is selected in block P640. An exemplary pair of values for the parameters {aspect_ratio_min, aspect_ratio_max} is {0.40, 1.20}. Otherwise, a set of relaxed parameters is selected in block P650. An exemplary pair of values for the parameters {aspect_ratio_min, aspect_ratio_max} is {0.30, 1.50}.

Size test block P422-1 may be implemented as a two-prong test, wherein each prong of the test must be satisfied. In the first prong, the total number of pixels corresponding to the face candidate region is tested. One suitable maximum values for the neutral case is 35% of the total number of pixels in a frame, while a suitable minimum value may be (2.5×16×16) pixels for a frame size less than 200×200 pixels, (5×16×16) pixels for a frame size less than 400×400 pixels, and (8×16×16) pixels otherwise. Suitable minimum values for the relaxed and constrained cases include 0.5 and 1.3 times the minimum value for the neutral case, respectively. Suitable maximum values for the relaxed and constrained cases include 1.1 and 0.9 times the maximum value for the neutral case, respectively.

In the second prong of size test block P422-1, the total number of pixels in the bounding box corresponding to the face candidate region is tested. A suitable maximum value for the neutral case is 50% of the total number of pixels in a frame, and suitable maximum values for the relaxed and constrained cases include 1.1 and 0.9 times the maximum value for the neutral case, respectively.

In position test block P422-2, a face candidate region is rejected if more than half of its corresponding pixels lie in a border region of the frame, where the border region is defined by four margins (left, right, top, and bottom). The distance of each of these margins from its respective edge of the frame may be described in terms of a percentage of the frame size in that dimension. For the neutral, relaxed, and constrained cases, suitable values for the left, right, top, and bottom margins are {12%, 12%, 15%, 25%}; {8%, 8%, 10%, 20%}; and {18%, 18%, 20%, 30%}, respectively.

In flatness test block P422-4, a face candidate region is rejected if the ratio between the average score of its entries and the maximum score among its entries is not above a predetermined threshold (i.e. if the region is not sufficiently uniform). Suitable thresholds for the neutral, relaxed, and constrained cases include 0.45, 0.40, and 0.50, respectively.

In shape test block P422-5, a face candidate region is rejected if the ratio between its area and the area of its corresponding bounding box does not exceed a predetermined threshold (i.e. if the region is not sufficiently rectangular). Suitable thresholds for the neutral, relaxed, and constrained cases include 0.35, 0.30, and 0.40, respectively.

In contrast test block P422-6, a face candidate region is rejected if the contrast between the average score of its interior entries and the average score of its boundary (i.e. the entries that are connected to region entries in a four-neighbor sense but are not in the region) does not exceed a predetermined threshold. Suitable thresholds for the neutral, relaxed, and constrained cases include 3.5, 2.5, and 3.5, respectively.

In an exemplary implementation, task P160 outputs a binary segmentation mask wherein each entry is marked as belonging to a face candidate region or to the background. In an alternative implementation, task P160 outputs a segmentation mask wherein each entry is marked as belonging to a particular one among the face candidate regions or to the background. In a particular application to video encoding, the segmentation mask is then used as a filter to direct encoding of the frame of video data such that more bits are allocated to encode the face candidate regions as compared to the background. Such a segmentation mask may be used in a similar fashion to distinguish the face candidate regions in other applications as well.

Figure 3:
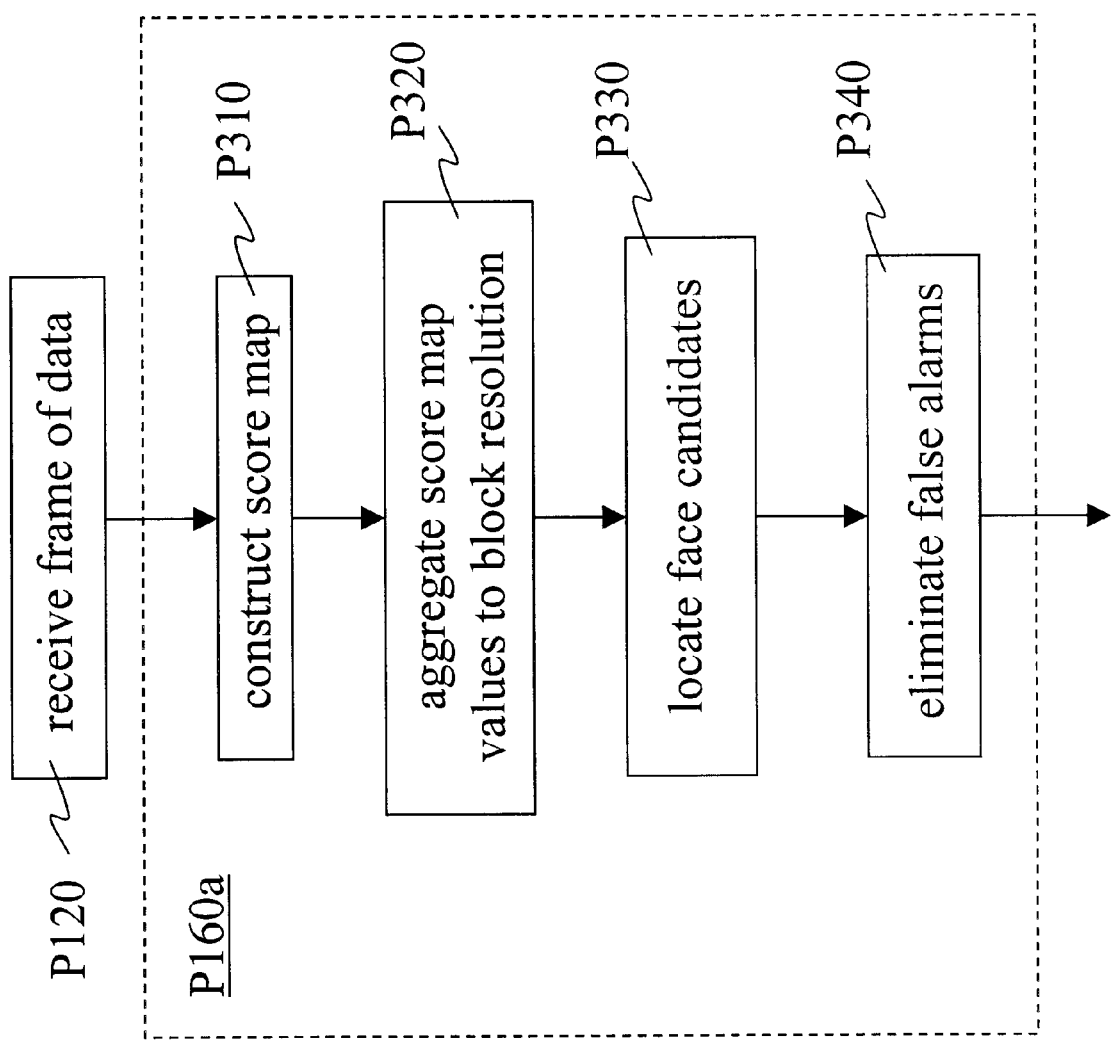
FIG. 3 is a flow chart for a method according to an embodiment of the invention.

It may be unnecessary or even undesirable to obtain and/or process a score map at full pixel resolution. In a method according to a further embodiment of the invention, a single score is assigned to each adjacent and non-overlapping block of M×N pixels. Such aggregation may occur before the score map is constructed in subtask P310, in which case construction subtask P310 operates on block values rather than on pixel values, and location subtask P330 operates on entries that correspond to blocks rather than to pixels. Alternatively, such aggregation may occur after the score map is constructed (e.g. as shown in FIG. 3), in which case location subtask P330 operates on entries that correspond to blocks rather than to pixels.

While it may be desirable to choose a single value for both block size parameters M and N, the two parameters may be assigned different or even dynamic values instead. Factors to be considered in choosing the block size parameters M and N may include the following:

1. The desired precision of the face tracking output. Some applications may demand resolutions down to the pixel level, in which case M and N are chosen to be one. In other situations, however, an application to be supported by face tracking may not require information at or below a predetermined level of resolution. In the case of an encoder according to one of the MPEG specifications (e.g., MPEG-1, MPEG-2 (ISO/IEC 13818-2), or MPEG-4, as published by the International Organization for Standardization, Geneva, Switzerland) or another discrete-cosine-transform-based scheme such as ITU-T Recommendation H.263 (February 1998) or H.263 version 2 (H.263+) (as published by the International Telecommunication Union, Geneva, Switzerland), for example, the coding unit is a 16×16-pixel macroblock. Because such a coding decision can only be made at a resolution of 16×16 pixels, M and N may each be chosen to have values of up to 16 before the coding resolution is affected.

2. Robustness of the tracking operation in the presence of noise. When pixels in a frame of video data (and/or their corresponding entries) are aggregated into blocks, the resulting low-pass filtering effect removes salt-and-pepper noise and helps to improve the robustness of future tracking steps.

3. Processor usage. The larger the block size, the lower the load on the processor for the face-tracking operation. Reducing the load on the processor frees computational capacity for other processor-intensive tasks such as video encoding.

4. Expected size of faces to be tracked. It may be desirable to choose M and N such that the smallest face to be tracked will be expected to occupy at least four blocks.

Figure 9:
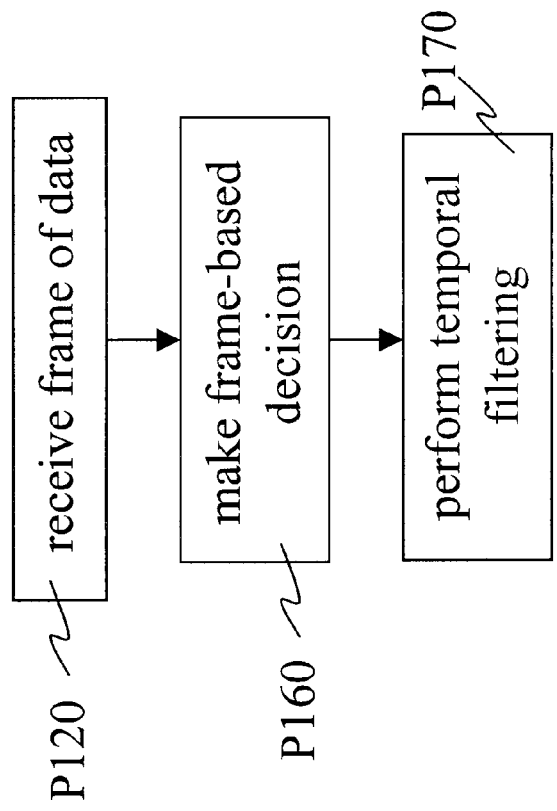
FIG. 9 is a flow chart for a method according to an embodiment of the invention.

Other available information may also be applied to improve the performance of a method as described above. For example, the appearance of a face in a video frame is highly correlated in both space and time. In other words, if a face appears at a particular location in one video frame, it is likely that a face also appears at or near the same location in video frames that are nearby in time. In a method according to a further embodiment of the invention as shown in FIG. 9, the mask outputted by task P160 undergoes temporal filtering in filter task P170.

In filter task P170, the classification of an entry or block as belonging to a face region or to the background may be modified by the classification of that entry or block in previous and/or future frames. On one hand, such temporal filtering may reduce the occurrence of false alarms by eliminating appearances that are not correlated in time. On the other hand, such filtering may also remedy missed detections by reclassifying a background entry or block as belonging to a face candidate region in accordance with information from surrounding frames.

Figure 10:
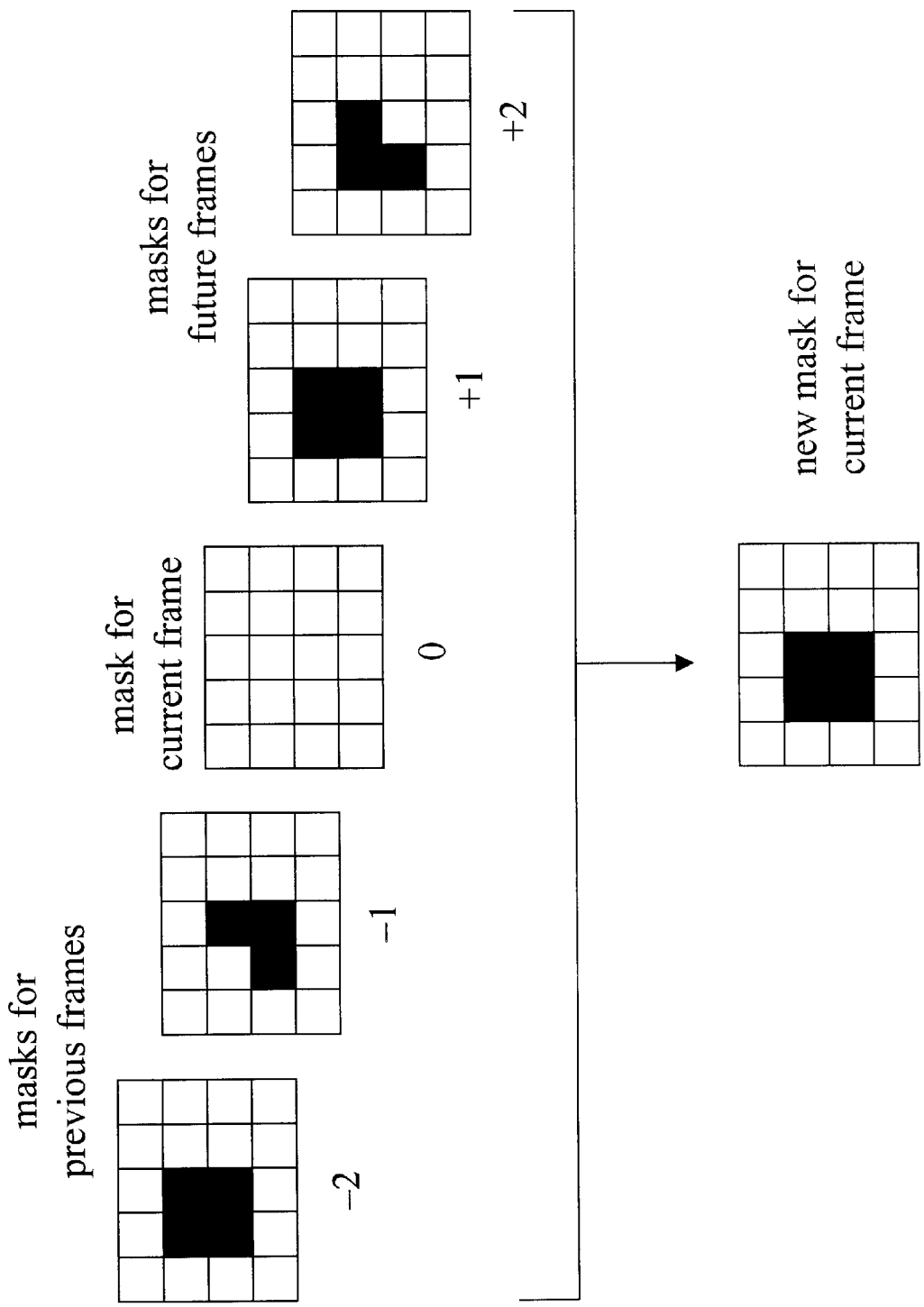
FIG. 10 is a diagram illustrating temporal filtering as performed in an exemplary implementation of task P170.

FIG. 10 shows the operation of filter task P170 in an exemplary embodiment. In such an embodiment, the value of each entry or block of the binary mask outputted by filter task P170 is a median function of the values of corresponding locations in a predetermined number of binary masks (i.e. as outputted by task P160) that may relate to the current frame, previous frames, and/or subsequent frames. In another embodiment, filter task P170 performs a similar operation on masks that have higher than binary values (i.e. masks wherein particular face candidate regions are distinguished). After output by filter task P170, additional post-processing operations, such as morphological operations, may also be performed on the mask as desired. Note that a delay will be encountered when using an implementation of filter task P170 that incorporates subsequent frames into its decision (as shown in FIG. 10).

Figure 11:
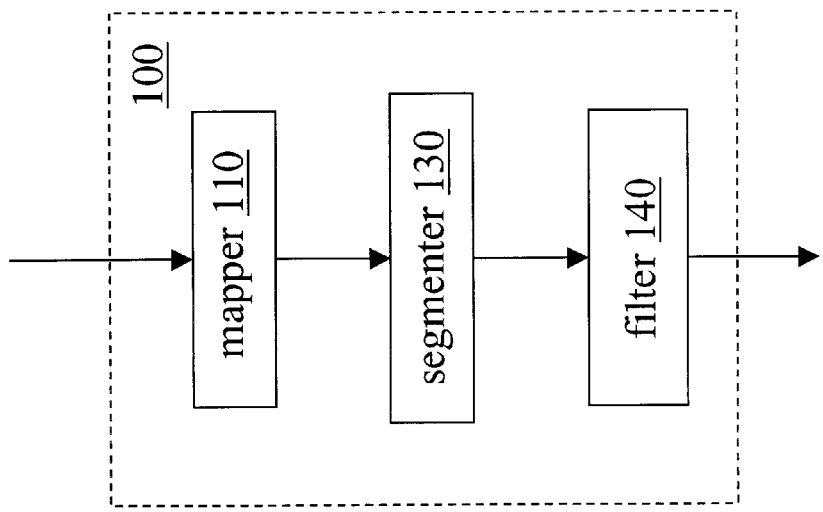
FIG. 11 is a block diagram for an apparatus according to an embodiment of the invention.

FIG. 11 shows a block diagram for an apparatus 100 according to an embodiment of the invention. Mapper 110 receives a frame of video data and produces a score map as described above wherein a value of each entry represents a measure of similarity between a value of a corresponding pixel and a human flesh tone. In one embodiment, mapper 110 obtains a value for each entry by using a value of a corresponding pixel to reference a lookup table, where the lookup table stores an appropriate similarity value for each among a range of possible pixel values.

Segmenter 130 receives the score map, locates face candidate regions within it (e.g. by performing an operation such as the region-growing subtask described above), and produces a mask indicating these regions. Filter 140 receives the mask and applies other rules as described above to remove false alarms from among the indicated candidate regions.

In one implementation, apparatus 100 includes one or more processors or other arrays of logic elements that execute machine-readable code obtained from a memory. In one example, a single processor is configured in accordance with such code to have the structures of mapper 110, segmenter 130, and filter 140 at different times. Such a processor may be a microprocessor or other digital signal processing unit and may also be fabricated into an application-specific integrated circuit or programmed into a field-programmable gate array.

Figure 12:
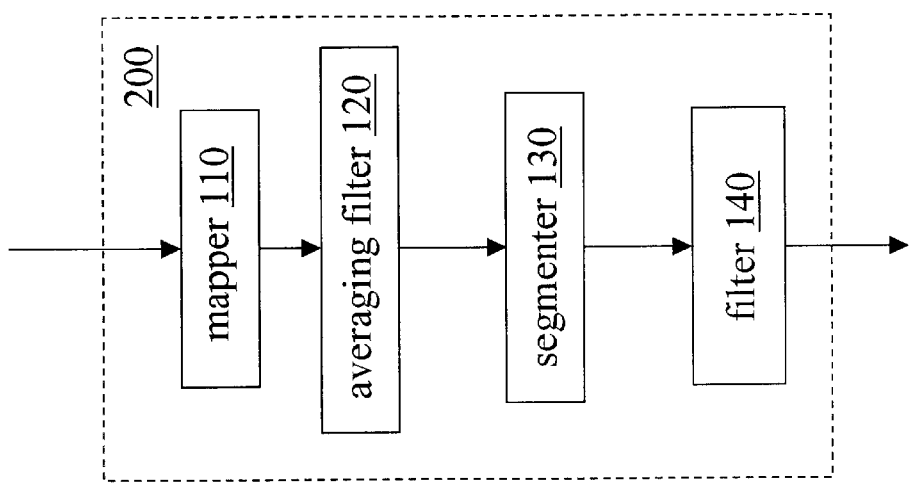
FIG. 12 is a block diagram for an apparatus according to an alternate embodiment of the invention.

FIG. 12 shows an apparatus according to an alternate embodiment of the invention, wherein the score map outputted by mapper 110 passes through an averaging filter 120 before entering segmenter 120. Averaging filter 120 produces an aggregated score map wherein each entry is an average (e.g. a mean or median) of a block of M×N score map entries, where the block size parameters M and N are chosen as described above.

It may be desired to combine a method according to an embodiment of the invention with another automated application such as control of a camera position, recognition of tracked faces, or content-directed video encoding. Such operations may be processor-intensive and may also have time constraints on their performance. In content-directed video encoding, for example, bits are intelligently allocated such that higher priority is given to regions of interest. Such regions of interest include areas containing important details such as human faces. Because a face may move within an image from frame to frame, it is desirable to apply face tracking in order to direct the bit allocation. However, the face-tracking operation may compete with the encoding operation for processor access. Therefore, buffer limitations or timeliness considerations may require allowing the encoding operation to block the face-tracking operation.

Figure 13A:
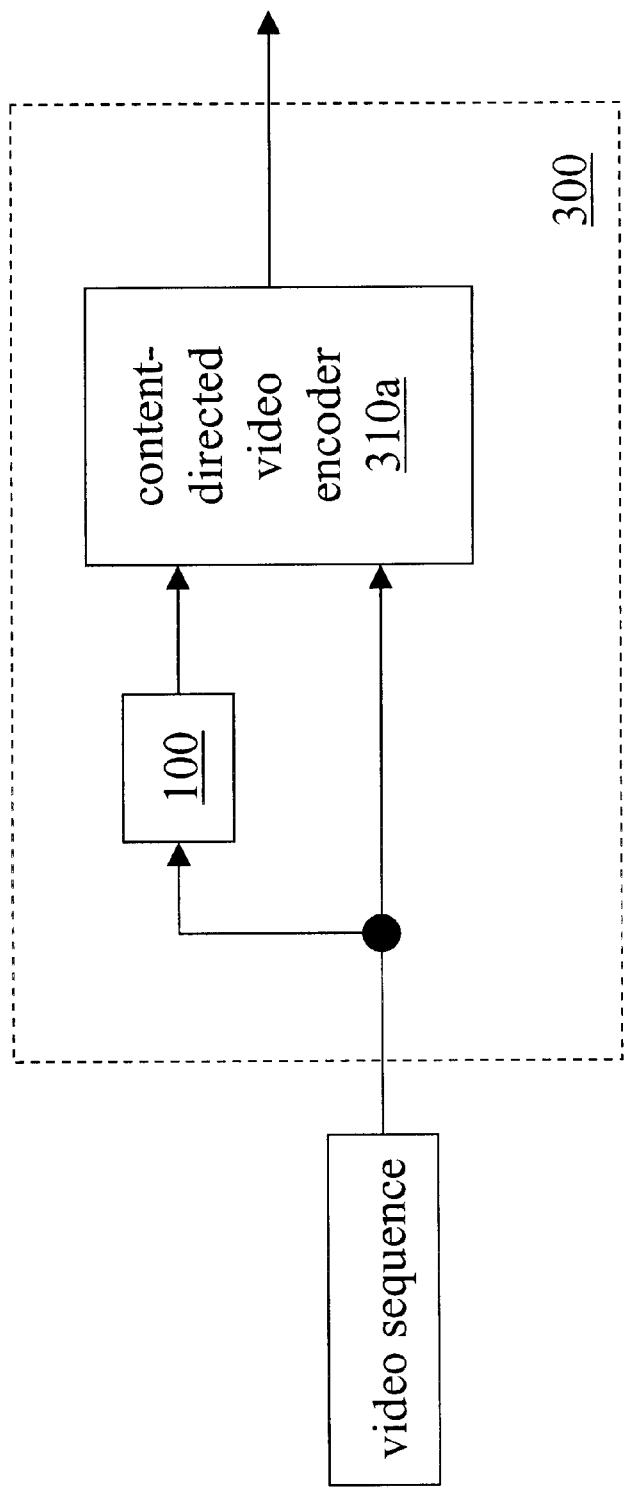
FIG. 13A is a block diagram for a system according to an embodiment of the invention.
Figure 13B:
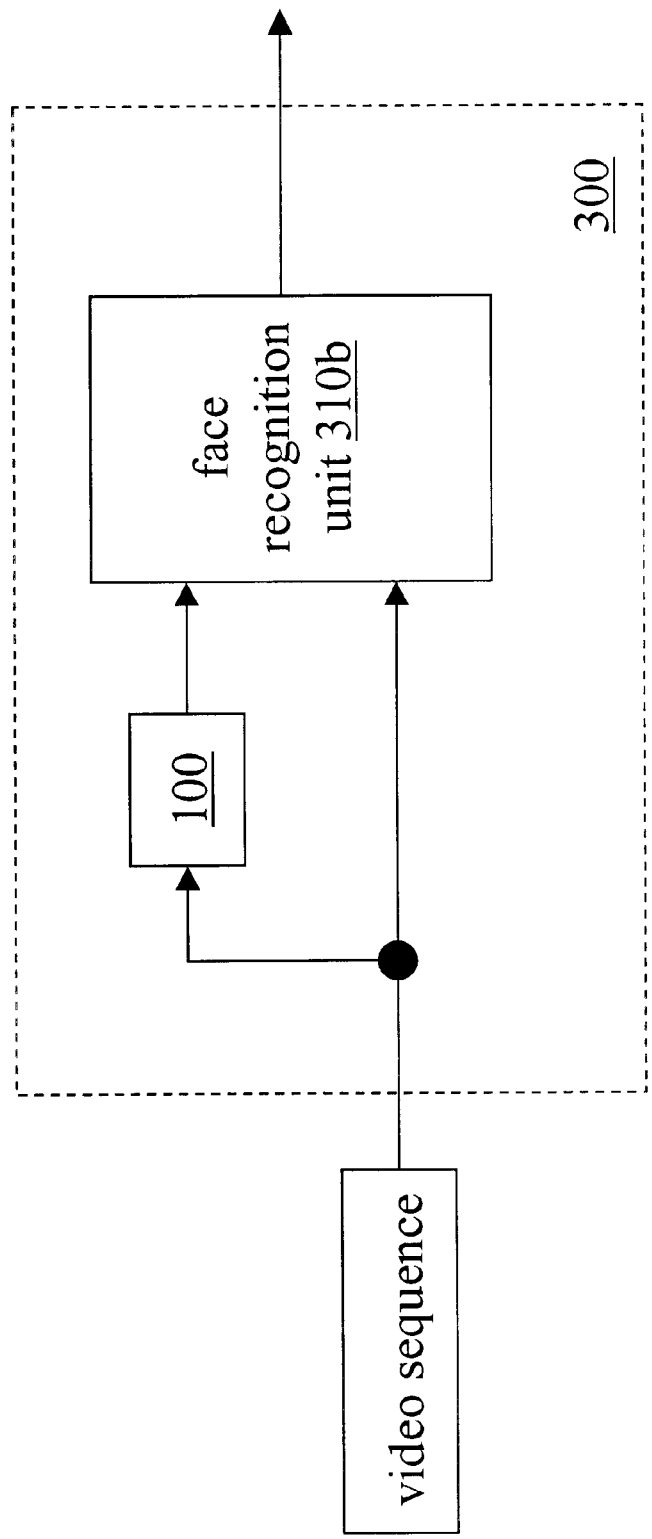
FIG. 13B is a block diagram for a system according to an alternate embodiment of the invention.

FIGS. 13A and 13B show block diagrams for two systems 300a and 300b according to embodiments of the invention. A video sequence (i.e. a series of frames of video data) is inputted to an apparatus 100 within system 300. Application 310 receives the video sequence and the masks outputted by apparatus 100 in response to the video sequence. In one particular implementation (FIG. 13A), application 310a is a content-directed video encoder which allocates more encoding bits to the face candidate regions indicated by the masks. In another implementation (FIG. 13B), application 310b is a face recognition unit that performs recognition operations (using, e.g., one or more eigenspace and/or neural network schemes in conjunction with a database of known faces) on the regions indicated by the masks.

Figure 14:
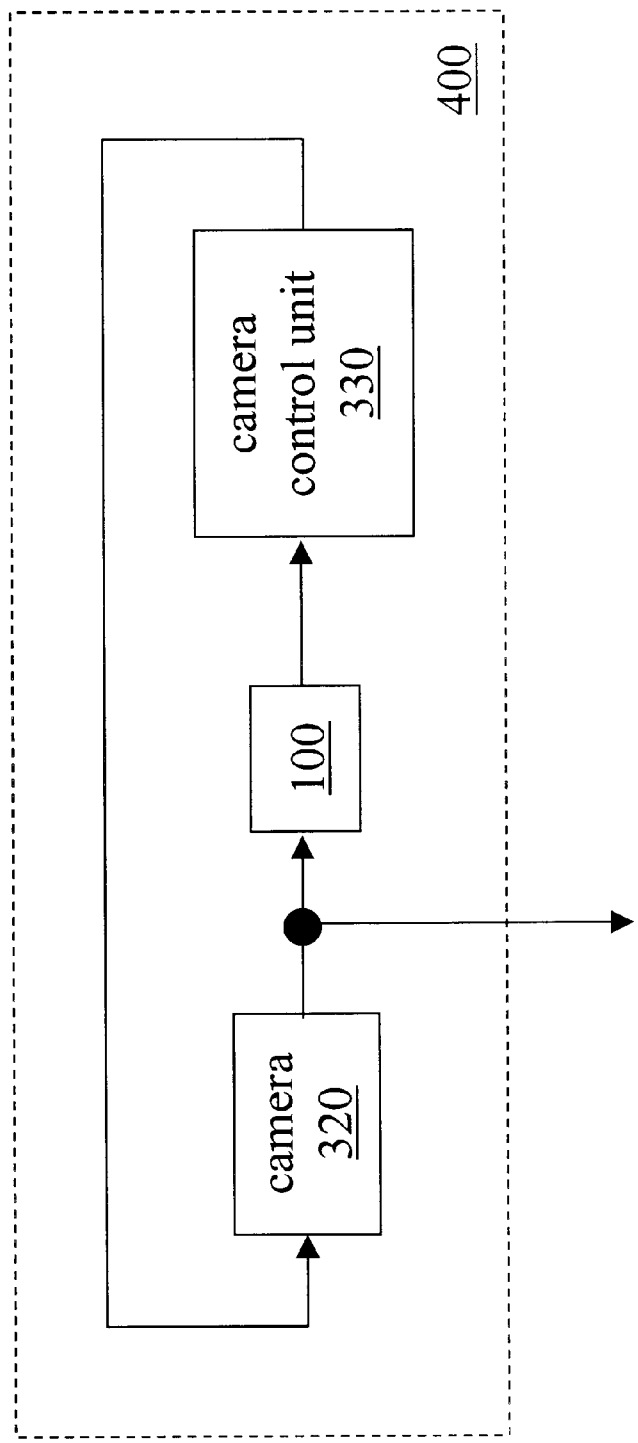
FIG. 14 is a block diagram for a system according to a further embodiment of the invention.

FIG. 14 shows a block diagram for a system 400 according to an alternate embodiment of the invention. Camera 320 outputs a video sequence to an external application (such as a video display or storage unit) and also to apparatus 100. Apparatus 100 outputs corresponding masks as described above to camera control unit 330. In response to, e.g., the locations of the face candidate regions as indicated in the masks, camera control unit 330 controls the position and/or focal length (i.e. zoom function) of camera 320 so that the faces of one or more of the human subjects will continue to appear in the video sequence. Camera control unit 330 may also incorporate temporal information into its control decisions by, for example, calculating one or more vectors corresponding to the movement of one or more of the face candidate regions over time.

A similar implementation of system 400 may also be used in telecine operations, wherein motion picture footage at an aspect ratio of 4:3 or 16:9 is converted to videotape at an aspect ratio of 1:1. By using such a system, the capture window may be automatically moved to include any faces in the sequence being converted.

Figure 15:
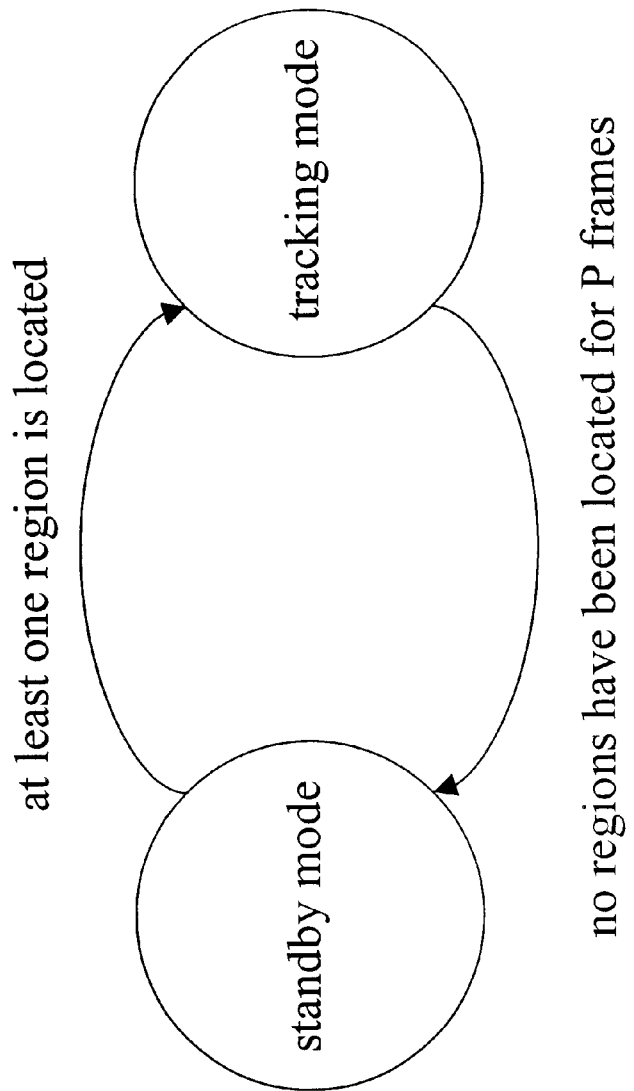
FIG. 15 is a state diagram that illustrates transitions between a standby mode and a tracking mode.

In a system, method, or apparatus according to a further embodiment of the invention, processor utilization is reduced by implementing alternate modes of operation. FIG. 15 shows a state diagram for an exemplary implementation of an apparatus that has a tracking mode and a monitoring or standby mode. When the apparatus is in tracking mode, it performs face-tracking operations as described above on every frame. When P consecutive frames have been processed without any face candidate regions having been located, the apparatus switches to standby mode. In standby mode, the apparatus performs face-tracking operations only on a portion of the frames received (e.g., only on every Q-th frame). When at least one face candidate region has been located, the apparatus switches to tracking mode. Assigning values of three and ten to the parameters P and Q, respectively, has been found to produce good results, although in other implementations each parameter may take on any positive nonzero integer value and may also have different values at different times. It may also be desirable to take the frame rate of the video sequence into account when assigning values to the parameters P and Q (the values suggested above may be used for a rate of 30 frames per second).

Figure 16:
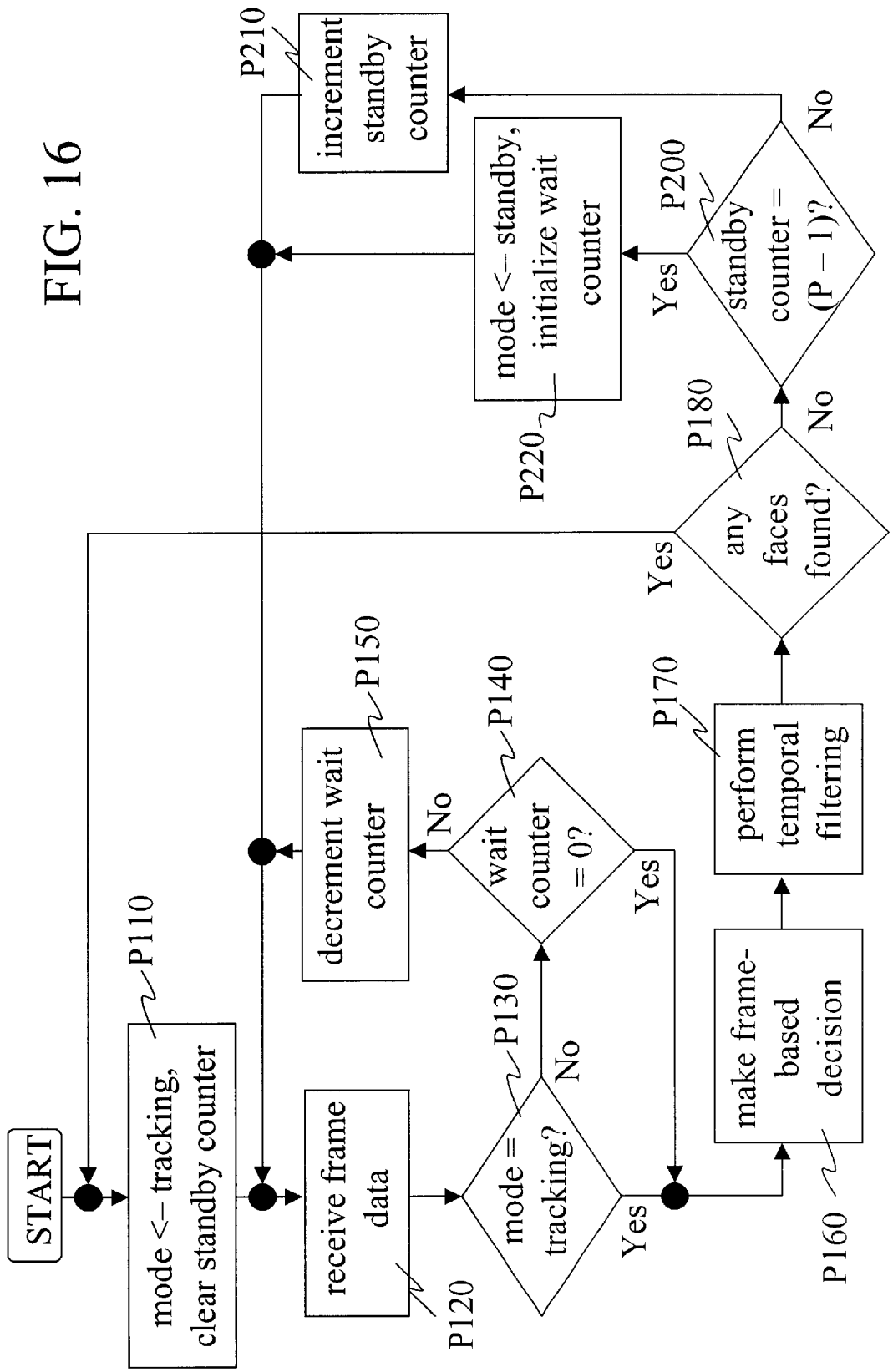
FIG. 16 is a flow chart for a method according to an embodiment of the invention.

FIG. 16 shows a flow chart for a method according to an embodiment of the invention that includes a particular implementation of such mode management, although many implementations are possible. An operating mode of the method may have two values, one corresponding to a tracking mode and the other corresponding to a standby mode. In the tracking mode, each frame of data is processed for face tracking. In a standby mode, processor utilization is reduced by processing only every Q-th frame.

In initialization subtask P110, the operating mode of the method is set to tracking, and the value of a standby counter is initialized (e.g. set to zero). In comparison subtask P130, the operating mode of the device of the method is tested. As described above, the method enters standby mode when no face candidate regions have been located for a predetermined number of frames. If the method is in standby mode, then the value of a wait counter is tested in comparison subtask P140. The wait counter keeps track of how many frames have passed since the last frame was processed. If the value of this counter is equal to zero, then the current frame is processed for face tracking (i.e. by performing tasks P160 and P170 as described above). Otherwise, the value of the wait counter is decremented in counter subtask P150 and the method waits to receive the next frame of video data in data subtask P120.

In comparison subtask P180, the mask outputted by filter task P170 is examined to determine whether any face candidate regions were located. If any such regions were located, then initialization subtask P110 is repeated, and the next frame of data is received in data subtask P120. If no such regions were located, then in comparison subtask P200 the value of the standby counter is compared to a predetermined threshold. In this implementation, if the value of the standby counter is less than (P−1), then the counter value is incremented in counter subtask P210 and the method returns to receive the next frame in data subtask P120. However, if the standby counter value is equal to (P−1), then in initialization task P220 the wait counter is initialized to a value which represents the number of incoming frames that the method will ignore when in standby mode (i.e. (Q−1)), and the method enters the standby mode.

As noted above, a method as shown in FIG. 16 moves from standby mode to tracking mode when a face candidate region is located in one of Q frames. Because the previous (Q−1) frames were not processed, it is possible that one or more of them also contain faces. Therefore, it may be desirable in certain applications to add a buffer at least of size (Q−1) to such a method to allow one or more of the (Q−1) most recent frames to be processed upon such a mode change. Note that a modification of this kind may not be appropriate or desirable for other applications, as it may require both a delay of at least (Q−1) frames and an increased processor load in the period following the mode change.

In alternative implementations, it may be desirable to provide more than the two states shown in FIG. 15 in order to allow for a more gradual transition between a tracking mode and a standby mode. For example, one or more intermediate modes may be provided in which processor utilization is reduced by performing tracking at a coarser resolution (e.g. by using higher values of block size parameters M and N). If a face candidate region is located during such an intermediate mode, then the state may shift to the tracking mode. If, on the other hand, no such regions are located in a predetermined number of frames, then the state may shift to the standby mode. Intermediate modes may be used in a similar fashion to make the transition from standby mode to tracking mode more gradual.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit or as a circuit configuration fabricated into an application-specific integrated circuit or field-programmable gate array. Likewise, as shown in FIG. 17A, the invention may be implemented in part or in whole as a firmware program loaded or fabricated into non-volatile storage (such as read-only memory or flash memory) as machine-readable code, such code being instructions executable by an array of logic elements such as a microprocessor or other digital signal processing unit.

Figure 17B:
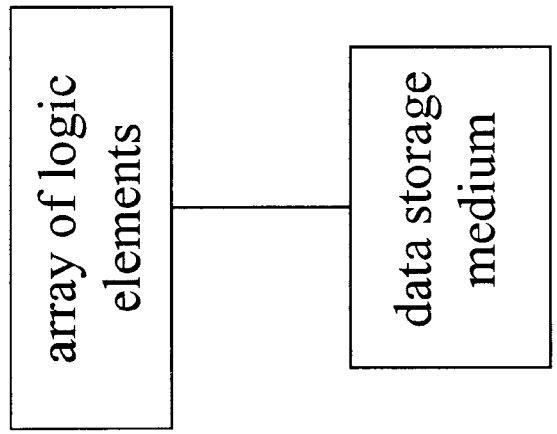
FIG. 17B is a block diagram of an implementation of an apparatus according to another embodiment of the invention.
Figure 17A:
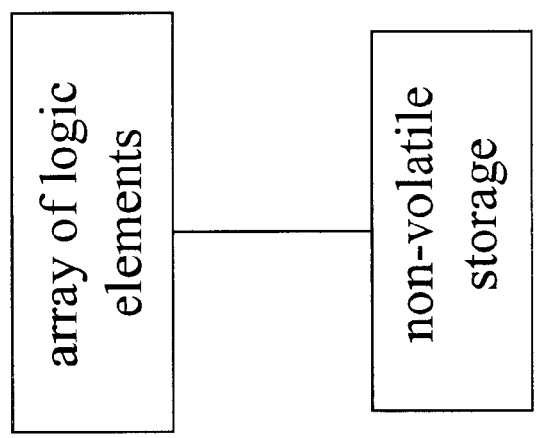
FIG. 17A is a block diagram of an implementation of an apparatus according to an embodiment of the invention.

Further, as shown in FIG. 17B, the invention may be implemented in part or in whole as a software program loaded as machine-readable code from or into a data storage medium such as a magnetic, optical, magnetooptical, or phase-change disk or disk drive; a semiconductor memory; or a printed bar code. Thus, the present invention is not intended to be limited to the embodiments shown above but rather is to be accorded the widest scope consistent with the principles and novel features disclosed in any fashion herein.

What is claimed is:

1. A method of tracking a plurality of face candidate regions in a digital video sequence comprising:

receiving a plurality of frames of video data;

a first operating mode, including constructing a score map based at least in part on one of said frames of video data, producing a mask for each frame of said plurality of
frames based on said score map, said mask indicating a plurality of face candidate regions, and filtering said mask to remove an indication of at least one among the plurality of face candidate regions; and a standby mode, wherein the first operating mode is practiced to track face candidate regions for each frame, and the standby mode performs face-tracking operations only on a portion of the frames of video data, said standby mode being operational when a specified number of consecutive frames have been processed without any face candidate regions being located.

2. The method of claim 1, wherein each frame of video data comprises a plurality of pixels, each pixel having a pixel value, and wherein said constructing a score map is based at least in part on a set of predetermined relations, each among said set of predetermined relations associating one among a range of possible pixel values with a flesh-tone probability value.

3. The method of claim 1, wherein said mask comprises a plurality of entries, and wherein each among said plurality of entries corresponds to a plurality of pixels.

4. The method of claim 1, wherein said score map comprises a plurality of entries, and wherein said producing a mask from said score map comprises locating the entry having the highest flesh-tone probability value.

5. The method of claim 4, wherein said producing a mask from said score map further comprises growing a region, said region comprising entries connected to the located entry and having a flesh-tone probability value higher than a predetermined threshold.

6. A method comprising:

receiving a frame of video data;

constructing a score map based at least in part on said frame of data;

producing a mask from said score map, said mask indicating a plurality of face candidate regions;

filtering said mask to remove an indication of at least one among the plurality of face candidate regions, said filtering including filtering said mask, wherein said mask comprises a plurality of entries, and wherein said temporal filtering said mask comprises obtaining an average of each entry and a corresponding entry of at least one temporally distinct mask, wherein each among said at least one temporally distinct mask is produced from a corresponding one among a plurality of temporally distinct score maps, each among said temporally distinct score maps being constructed based at least in part on a corresponding one among a plurality of temporally distinct frames of video data, and wherein said plurality of temporally distinct frames of video data includes at least one among a set of previous frames of video data and a set of subsequent frames of video data.

7. The method of claim 1, wherein said filtering said mask to remove an indication of at least one among the plurality of face candidate regions comprises testing at least one among a size, a position, an aspect ratio, an intra-region flatness, a shape, and a contrast between interior and boundary areas of at least one among the plurality of face candidate regions.

8. An apparatus for tracking a plurality of face candidate regions in a digital video sequence comprising:

a mapper configured and arranged to receive a plurality of frames of data and produce a score map based at least in part on a frame of the data;

a segmenter configured and arranged to receive the score map and produce a mask for each frame, the mask indicating a plurality of face candidate regions; and a filter configured and arranged to receive the mask and remove an indication of at least one among the plurality of face candidate regions, wherein the apparatus has a normal operational mode in which the apparatus tracks face candidate regions for each frame, and a standby mode in which the apparatus performs face-tracking operations only on a portion of the plurality of frames, said standby mode becoming operational when a specified number of consecutive frames have been processed without any face candidate regions being located.

9. The apparatus of claim 8, wherein the frame of video data comprises a plurality of pixels, each pixel having a pixel value, and wherein said mapper produces the score map according to at least a set of predetermined relations, each among said set of predetermined relations associating one among a range of possible pixel values with a flesh-tone probability value.

10. The apparatus of claim 8, wherein the mask comprises a plurality of entries, and wherein each among the plurality of entries corresponds to a plurality of pixels.

11. The apparatus of claim 8, wherein the score map comprises a plurality of entries, and wherein said segmenter produces the mask from the score map at least in part by locating the entry having the highest flesh-tone probability value.

12. The apparatus of claim 11, wherein said segmenter further produces the mask from the score map by growing a region, the region comprising entries connected to the located entry and having a flesh-tone probability value higher than a predetermined threshold.

13. An apparatus comprising:

a mapper configured and arranged to receive a frame of data and produce a score map based at least in part on the frame of data;

a segmenter configured and arranged to receive the score map and produce a mask, the mask indicating a plurality of face candidate regions; and a filter configured and arranged to receive the mask and remove an indication of at least one among the plurality of face candidate regions, said filter being a temporal filter configured and arranged to receive the mask and produce a temporally filtered mask, wherein the temporally filtered mask comprises a plurality of entries, and wherein said temporal filter obtains an average of each entry and a corresponding entry of at least one temporally distinct mask, wherein each among said at least one temporally distinct mask is produced from a corresponding one among a plurality of temporally distinct score maps, each among said temporally distinct score maps being constructed based at least in part on a corresponding one among a plurality of temporally distinct frames of video data, and wherein said plurality of temporally distinct frames of video data includes at least one among a set of previous frames of video data and a set of subsequent frames of video data.

14. The apparatus of claim 8, wherein said filter tests at least one among a size, a position, an aspect ratio, an intra-region flatness, a shape, and a contrast between interior and boundary areas of at least one among the plurality of face candidate regions.

15. A system comprising:
an apparatus including
a mapper configured and arranged to receive a frame of data and produce a score map based at least in part on the frame of data;
a segmenter configured and arranged to receive the score map and produce a mask, the mask indicating a plurality of face candidate regions; and
a filter configured and arranged to receive the mask and remove an indication of at least one among the plurality of face candidate regions, and
a video encoder configured and arranged to receive the frame of data and the mask and produce an encoded stream representing the frame of data, said encoded stream comprising a plurality of bits,
wherein, in accordance at least with said mask, the video encoder is further configured and arranged to allocate a disproportionate number of said plurality of bits to at least one part of the encoded stream that represents an area of the frame of data that corresponds to one among the plurality of face candidate regions.

16. The system of claim 15, wherein the frame of video data comprises a plurality of pixels, each pixel having a pixel value, and
wherein said mapper produces the score map according to at least a set of predetermined relations, each among said set of predetermined relations associating one among a range of possible pixel values with a flesh-tone probability value.

17. The system of claim 15, wherein the score map comprises a plurality of entries, and
wherein said segmenter produces the mask from the score map at least in part by locating the entry having the highest flesh-tone probability value.

18. The system of claim 17, wherein said segmenter further produces the mask from the score map by growing a region, the region comprising entries connected to the located entry and having a flesh-tone probability value higher than a predetermined threshold.

19. The system of claim 15, said filter further comprising a temporal filter,
wherein the mask comprises a plurality of entries, and
wherein said temporal filter obtains an average of each entry and a corresponding entry of at least one temporally distinct mask,
wherein each among said at least one temporally distinct mask is produced from a corresponding one among a plurality of temporally distinct score maps, each among said temporally distinct score maps being constructed based at least in part on a corresponding one among a plurality of temporally distinct frames of video data, and
wherein said plurality of temporally distinct frames of video data includes at least one among a set of previous frames of video data and a set of subsequent frames of video data.

20. The system of claim 15, wherein said filter tests at least one among a size, a position, an aspect ratio, an intra-region flatness, a shape, and a contrast between interior and boundary areas of at least one among the plurality of face candidate regions.

21. A system comprising:
a camera configured and arranged to output frames of data over successive periods of time;
an apparatus for performing face-tracking operations including
a mapper configured and arranged to receive a plurality of the frames of data and produce a plurality of score maps, each among said plurality of score maps based at least in part on a corresponding one among the plurality of frames of data;
a segmenter configured and arranged to receive the plurality of score maps and produce a corresponding plurality of masks, each among said plurality of masks indicating a corresponding plurality of face candidate regions;
a filter configured and arranged to receive the plurality of masks and remove an indication of at least one among the corresponding plurality of face candidate regions indicated by at least one among the plurality of masks,
wherein the apparatus has a normal operational mode in which the apparatus tracks face candidate regions for each frame, and a standby mode in which the apparatus performs face-tracking operations only on a portion of the plurality of frames, said standby mode becoming operational when a specified number of consecutive frames have been processed without any face candidate regions being located; and
a camera control unit configured and arranged to receive the plurality of masks and control at least one movement of the camera,
wherein said at least one movement of the camera is responsive to at least one comparison of (A) a face candidate region indicated in a mask corresponding to one frame of data to (B) a face candidate region indicated in a mask corresponding to another frame of data.

22. The system of claim 21, wherein each among the frames of video data comprises a plurality of pixels, each pixel having a pixel value, and
wherein said mapper produces the plurality of score maps according to at least a set of predetermined relations, each among said set of predetermined relations associating one among a range of possible pixel values with a flesh-tone probability value.

23. The system of claim 21, wherein each among the plurality of score maps comprises a plurality of entries, and
wherein said segmenter produces each among the plurality of masks from a corresponding score map at least in part by locating the entry having the highest flesh-tone probability value.

24. The system of claim 23, wherein said segmenter further produces each among the plurality of masks from a corresponding score map by growing a region, the region comprising entries connected to the located entry and having a flesh-tone probability value higher than a predetermined threshold.

25. A system comprising:
a camera configured and arranged to output frames of data over successive periods of time;
an apparatus including:

a mapper configured and arranged to receive a plurality of the frames of data and produce a plurality of score maps, each among said plurality of score maps based at least in part on a corresponding one among the plurality of frames of data;

a segmenter configured and arranged to receive the plurality of score maps and produce a corresponding plurality of masks, each among said plurality of masks indicating a corresponding plurality of face candidate regions; and a filter configured and arranged to receive the plurality of masks and remove an indication of at least one among the corresponding plurality of face candidate regions indicated by at least one among the plurality of masks, a temporal filter configured and arranged to receive the plurality of masks and produce a corresponding plurality of temporally filtered masks, wherein each among the plurality of masks comprises a plurality of entries, wherein each among the plurality of temporally filtered masks comprises a plurality of temporally filtered entries, wherein each among the plurality of entries in one among the plurality of masks corresponds to one among the plurality of entries in each of the others among the plurality of masks, and wherein said temporal filter obtains an average of each among the plurality of entries in one among the plurality of masks and the corresponding one among the plurality of entries in at least one of the others among the plurality of masks; and a camera control unit configured and arranged to receive the plurality of masks and control at least one movement of the camera, wherein said at least one movement of the camera is responsive to at least one comparison of (A) a face candidate region indicated in a mask corresponding to one frame of data to (B) a face candidate region indicated in a mask corresponding to another frame of data.

26. The system of claim 21, wherein said filter tests at least one among a size, a position, an aspect ratio, an intra-region flatness, a shape, and a contrast between interior and boundary areas of at least one among the plurality of face candidate regions.

27. An apparatus comprising a data storage medium, said data storage medium having machine-readable code stored thereon, the machine-readable code including instructions executable by an array of logic elements, the instructions defining a method including:

receiving a plurality of frames of video data;

a first operating mode, including
constructing a score map based at least in part on a frame of video data,
producing a mask for each frame from said score map, said mask indicating a plurality of face candidate regions, and
filtering said mask to remove an indication of at least one among the plurality of face candidate regions; and a standby mode, wherein the first operating mode is practiced to track face candidate regions for each frame, and the standby mode performs face-tracking operations only on a portion of the frames of video data, said standby mode being operational when a specified number of consecutive frames have been processed without any face candidate regions being located.

28. The apparatus of claim 27, wherein the frame of video data comprises a plurality of pixels, each pixel having a pixel value, and wherein said constructing a score map is based at least in part on a set of predetermined relations, each among said set of predetermined relations associating one among a range of possible pixel values with a flesh-tone probability value.

29. The apparatus of claim 27, wherein said mask comprises a plurality of entries, and wherein each among said plurality of entries corresponds to a plurality of pixels.

30. The apparatus of claim 27, wherein said score map comprises a plurality of entries, and wherein said producing a mask from said score map comprises locating the entry having the highest flesh-tone probability value.

31. The apparatus of claim 30, wherein said producing a mask from said score map further comprises growing a region, said region comprising entries connected to the located entry and having a flesh-tone probability value higher than a predetermined threshold.

32. An apparatus comprising a data storage medium, said data storage medium having machine-readable code stored thereon, the machine-readable code including instructions executable by an array of logic elements, the instructions defining a method including:

receiving a frame of video data;

constructing a score map based at least in Dart on said frame of data;

producing a mask from said score map, said mask indicating a plurality of face candidate region; and filtering said mask to remove an indication of at least one among the plurality of face candidate regions, said filtering including temporal filtering said mask, wherein said mask comprises a plurality of entries, wherein said temporal filtering said mask comprises obtaining an average of each entry and a corresponding entry of at least one temporally distinct mask, wherein each among said at least one temporally distinct mask is produced from a corresponding one among a plurality of temporally distinct score maps, each among said temporally distinct score maps being constructed based at least in part on a corresponding one among a plurality of temporally distinct frames of video data, and wherein said plurality of temporally distinct frames of video data includes at least one among a set of previous frames of video data and a set of subsequent frames of video data.

33. The apparatus of claim 27, wherein said filtering said mask to remove an indication of at least one among the plurality of face candidate regions comprises testing at least one among a size, a position, an aspect ratio, an intra-region flatness, a shape, and a contrast between interior and boundary areas of at least one among the plurality of face candidate regions.

* * * * *